G. E. ANDREWS.
BATTERY COVERING.
APPLICATION FILED MAY 21, 1909.
932,841.
Patented Aug. 31, 1909.
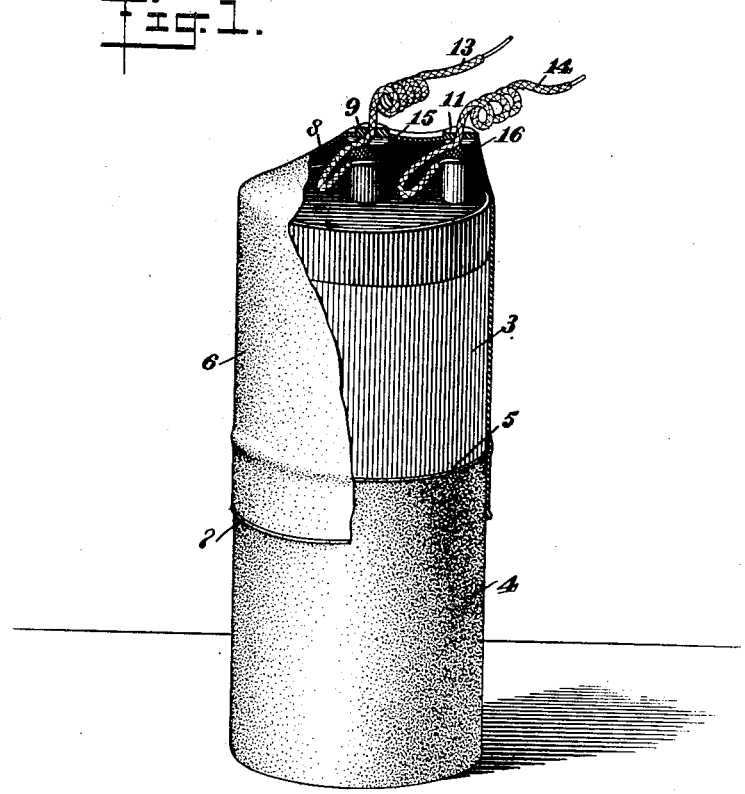
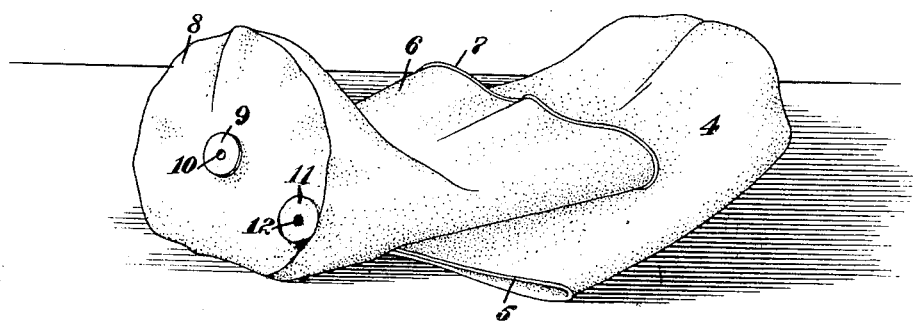
WITNESSES
INVENTOR
George E. Andrews
BY
ATTORNEYS

UNITED STATES PATENT OFFICE.

GEORGE E. ANDREWS, OF PROVIDENCE, RHODE ISLAND.

BATTERY-COVERING.

932,841.   Specification of Letters Patent.   Patented Aug. 31, 1909.

Application filed May 21, 1909. Serial No. 497,531.

*To all whom it may concern:*

Be it known that I, GEORGE E. ANDREWS, a citizen of the United States, and a resident of Providence, in the county of Providence and State of Rhode Island, have invented a new and Improved Battery-Covering, of which the following is a full, clear, and exact description.

My invention relates to battery coverings, my more particular purpose being to provide a two-part covering made of rubber, and provided with means for rendering a battery cell so completely watertight that the cell may be effectively employed where moisture is excessive, or even be totally submerged under the surface of water.

While my improved battery covering may be employed in a variety of relations, I preferably use it for the purpose of protecting dry batteries.

Reference is to be had to the accompanying drawings forming a part of this specification, in which similar characters of reference indicate corresponding parts in both the figures.

Figure 1 is a perspective view, partly broken away, showing a dry cell equipped with my improved covering and ready for use under water; and Fig. 2 is a perspective showing the two bag-like portions of the covering removed from the cell.

A battery cell is shown at 3 and one of the bag-like portions of the covering at 4, the same being provided with a thickened edge 5. The other bag-like portion is shown at 6 and is provided with a thickened edge 7. The portion 6 has a top 8 and the material thereof is provided with a thickened portion 9 having substantially the form of a disk and provided with a hole 10. This hole is substantially in alinement with the general vertical axis of the battery cell. Another portion 11, having also the form of a disk, is provided with a hole 12 disposed adjacent to the outer circumference of the cell.

At 13, 14 are the battery wires which extend through the holes 10, 12 and are secured to binding posts 15, 16 within the bag-like portion 6 of the battery covering. The wires 13, 14 fit watertight in the holes 10, 12, and since the two parts 4, 6 are stretched tightly in position over the cell, the ingress of water is effectively prevented, the thickened edges 5, 7 contributing to this end.

Having thus described my invention, I claim as new and desire to secure by Letters Patent:

1. A battery covering, comprising two bag-like portions to be pulled over opposite ends of a battery cell, each of said portions being provided with a thickened rim, said portions overlapping each other in order to enable said thickened portions to aid in sealing against the entrance of water, one of said bag-like portions being provided with holes through which wires may be extended.

2. In a battery covering, the combination of a bag-like member of rubber provided with thickened portions, and with holes extending through said thickened portions for the purpose of receiving wires, said bag-like member being thickened at one of its edges for the purpose of excluding the entrance of water.

In testimony whereof I have signed my name to this specification in the presence of two subscribing witnesses.

GEORGE E. ANDREWS.

Witnesses:
FRANK BARNBROOK,
ANDREW A. MOFFITT.